(12) United States Patent
Jungert et al.

(10) Patent No.: US 8,870,286 B2
(45) Date of Patent: Oct. 28, 2014

(54) ADJUSTING DEVICE FOR A VEHICLE SUBASSEMBLY TO BE ADJUSTED

(75) Inventors: Dieter Jungert, Weissach (DE); Tassilo Gilbert, Pforzheim (DE); Thomas Heger, Lorch-Waldhausen (DE); Nino Andricevic, Stuttgart (DE); Jens Fechler, Huefingen (DE); Matthias Koop, Donaueschingen (DE); Wilfried Synovzik, Huefingen (DE); Wolfram Hofschulte, Bonndorf (DE); Stephan Oberle, Villingen-Schwenningen (DE)

(73) Assignees: Dr. Ing. H.C.F. Porsche Aktiengesellschaft, Stuttgart (DE); IMS Gear GmbH, Donaueschingen (DE)

( * ) Notice: Subject to any disclaimer, the term of this patent is extended or adjusted under 35 U.S.C. 154(b) by 293 days.

(21) Appl. No.: 13/283,052

(22) Filed: Oct. 27, 2011

(65) Prior Publication Data

US 2012/0104817 A1    May 3, 2012

(30) Foreign Application Priority Data

Oct. 27, 2010  (DE) .......................... 10 2010 049 479

(51) Int. Cl.
*B60N 2/20* (2006.01)
*B60N 2/02* (2006.01)
*B60N 2/16* (2006.01)
*F16H 29/20* (2006.01)
*B60N 2/10* (2006.01)
*B60N 2/18* (2006.01)
*B60N 2/22* (2006.01)

(52) U.S. Cl.
CPC ................ *B60N 2/02* (2013.01); *B60N 2/0232* (2013.01); *B60N 2/10* (2013.01); *B60N 2/18* (2013.01); *B60N 2002/0236* (2013.01); *B60N 2/166* (2013.01); *B60N 2/2231* (2013.01)
USPC ................ 297/362.11; 297/330; 297/344.12; 74/89.14

(58) Field of Classification Search
USPC .............. 297/362, 362.11, 362.14, 313, 330, 297/344.12; 74/89.14
See application file for complete search history.

(56) References Cited

U.S. PATENT DOCUMENTS

| 4,195,881 A | * | 4/1980  | Kluting et al. ........... 297/216.13 |
| 4,521,055 A | * | 6/1985  | Fudala ........................... 297/362 |
| 4,685,735 A | * | 8/1987  | McFalls et al. ............... 297/362 |
| 5,163,734 A | * | 11/1992 | Hakansson ................... 297/330 |
| 5,295,730 A | * | 3/1994  | Rees .......................... 297/361.1 |
| 5,435,624 A |   | 7/1995  | Bray et al. |

(Continued)

FOREIGN PATENT DOCUMENTS

| DE | 41 30 079  | 3/1993 |
| DE | 43 11 178  | 3/1994 |
| DE | 43 21 720  | 1/1995 |
| DE | 199 04 224 | 9/2000 |
| DE | 102 33 769 | 3/2003 |

*Primary Examiner* — Milton Nelson, Jr.
(74) *Attorney, Agent, or Firm* — Gerald E. Hespos; Michael J. Porco; Matthew T. Hespos

(57) ABSTRACT

An adjusting device (10) is provided for a vehicle subassembly to be adjusted. The adjusting device has an adjusting motor which, via an adjusting mechanism, drives a toothed rocker (12) assigned to the vehicle subassembly to be adjusted. The adjusting mechanism structurally reinforces the vehicle subassembly to be adjusted, and an adjusting worm (20) of the structurally reinforcing adjusting mechanism acts directly on the toothed rocker (12).

14 Claims, 8 Drawing Sheets

(56) References Cited

U.S. PATENT DOCUMENTS

| | | | |
|---|---|---|---|
| 5,669,667 A * | 9/1997 | Schmidt | 297/408 |
| 6,428,104 B1 * | 8/2002 | Sakamoto et al. | 297/362.11 |
| 7,246,858 B2 * | 7/2007 | Hsu | 297/362.12 |
| 2004/0135415 A1 | 7/2004 | Sakamoto | |
| 2009/0021066 A1 * | 1/2009 | Nathan et al. | 297/362 |

* cited by examiner

US 8,870,286 B2

ADJUSTING DEVICE FOR A VEHICLE SUBASSEMBLY TO BE ADJUSTED

CROSS REFERENCE TO RELATED APPLICATION

This application claims priority under 35 USC 119 to German Patent Application No. 10 2010 049 479.8 filed on Oct. 27, 2010, the entire disclosure of which is incorporated herein by reference.

BACKGROUND OF THE INVENTION

1. Field of the Invention

The invention relates to an adjusting device for a vehicle subassembly to be adjusted, such as an adjusting device for a vehicle seat. The invention also relates to a vehicle seat having at least one such adjusting device.

2. Description of the Related Art

DE 41 30 079 A1 discloses adjusting devices that enable an inclination or a height of a vehicle seat to be adjusted. The adjusting devices disclosed in this prior art comprise an adjusting motor that cooperates with an adjusting mechanism to drive a toothed rocker of the vehicle seat to adjust the vehicle seat. The adjusting mechanism is formed by a drive worm, a worm wheel and an adjusting worm. The drive worm drives the worm wheel and the adjusting worm drives the toothed rocker. The worm wheel and the adjusting worm are arranged on a common shaft. DE 41 30 079 A1 uses a first housing that only can be loaded statically in combination with a second housing that can be loaded both statically and dynamically to mount the adjusting worm and the worm wheel and the shaft that receives the two elements. The adjusting worm, the worm wheel of the adjusting mechanism and the shaft that receives the two elements are mounted in the first housing and are fastened to the vehicle subassembly that is to be adjusted via the second housing so that the second housing partially surrounds the first housing. This results in a relatively complicated construction for the adjusting device and a high weight for the vehicle subassembly to be adjusted.

In view of the above, an object of the present invention is based is to provide a novel adjusting device for a vehicle subassembly to be adjusted and also a novel vehicle seat, each having a simpler construction and a lower weight.

SUMMARY OF THE INVENTION

The invention relates to an adjusting mechanism that structurally reinforces the vehicle subassembly to be adjusted. The structurally reinforcing adjusting mechanism includes an adjusting worm that acts directly on a toothed rocker. More particularly, the adjusting mechanism is part of a structural component of the vehicle subassembly to be adjusted and acts in a structurally reinforcing manner. Accordingly, the adjusting mechanism acts as a structurally reinforcing subassembly and transfers forces and moments in the event of a crash. As a result, other structural components may be smaller, lighter or dispensed with completely. Thus, the invention has a simpler construction and achieves a weight saving for the vehicle subassembly to be adjusted.

The adjusting worm preferably is a self-locking locking worm. Locking of the vehicle subassembly to be adjusted is effected directly between the adjusting worm and the toothed rocker. The adjusting mechanism preferably is an integral component of a crash-designed structural component of the vehicle subassembly to be adjusted.

The adjusting worm preferably is mounted directly on a crash-designed structural component of the vehicle subassembly to be adjusted. Thus, the structural component of the vehicle subassembly to be adjusted forms an adjusting mechanism housing that guarantees a secure locking of the vehicle subassembly to be adjusted via the adjusting worm even in the event of a crash.

The adjusting worm may be accommodated in a separate adjusting mechanism housing. The separate adjusting mechanism housing may be an integral component of the crash-designed structural component and structurally reinforces the crash-designed structural component particularly in the event of a crash.

Exemplary embodiments of the invention will be explained in more detail with reference to the drawing without being restricted thereto.

DETAILED DESCRIPTION OF THE PREFERRED EMBODIMENTS

The invention relates to an adjusting device for a vehicle subassembly to be adjusted, in particular for a vehicle seat to be adjusted.

Figure 1:
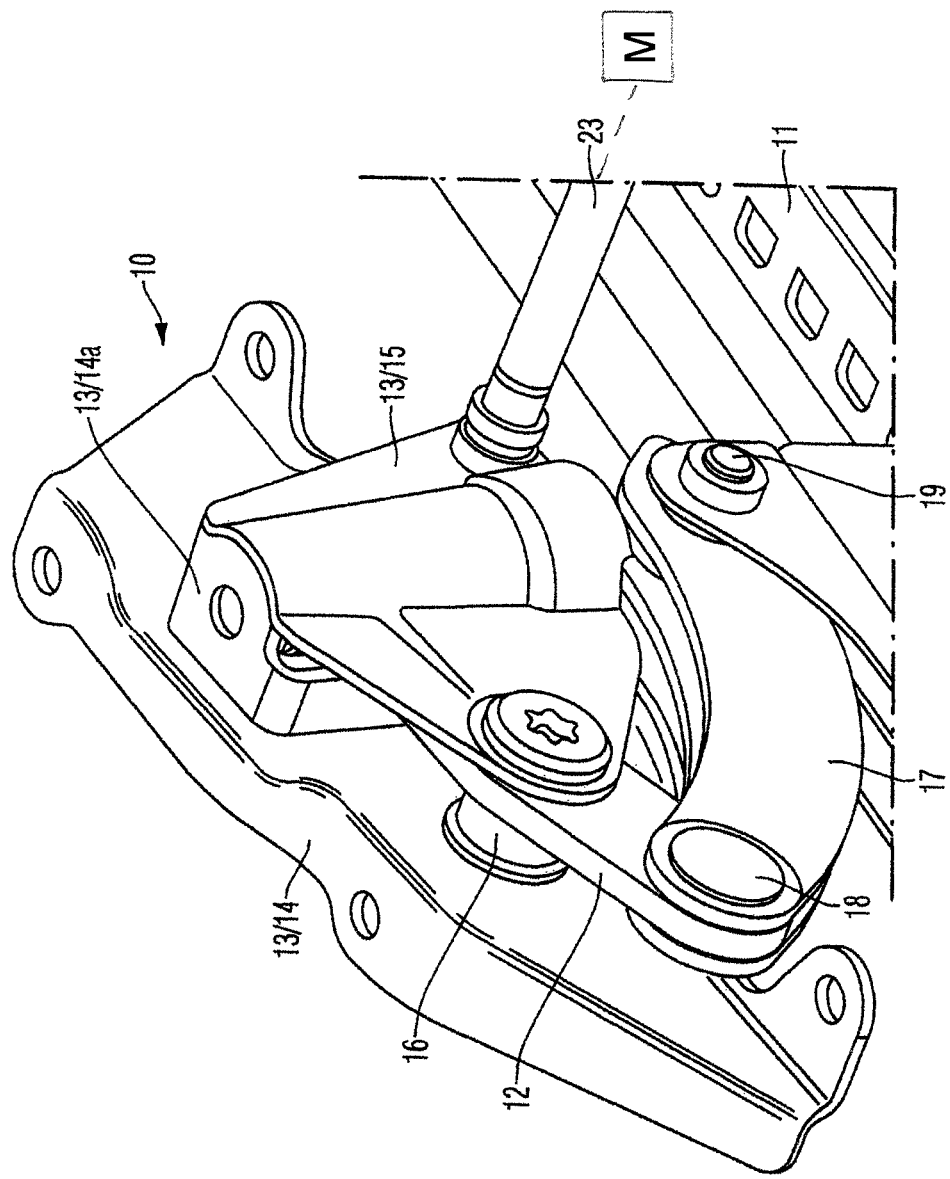
FIG. 1 is a perspective view of a detail of an adjusting device according to a first embodiment of the invention together with a structural component of a vehicle subassembly to be adjusted by the adjusting device.
Figure 2:
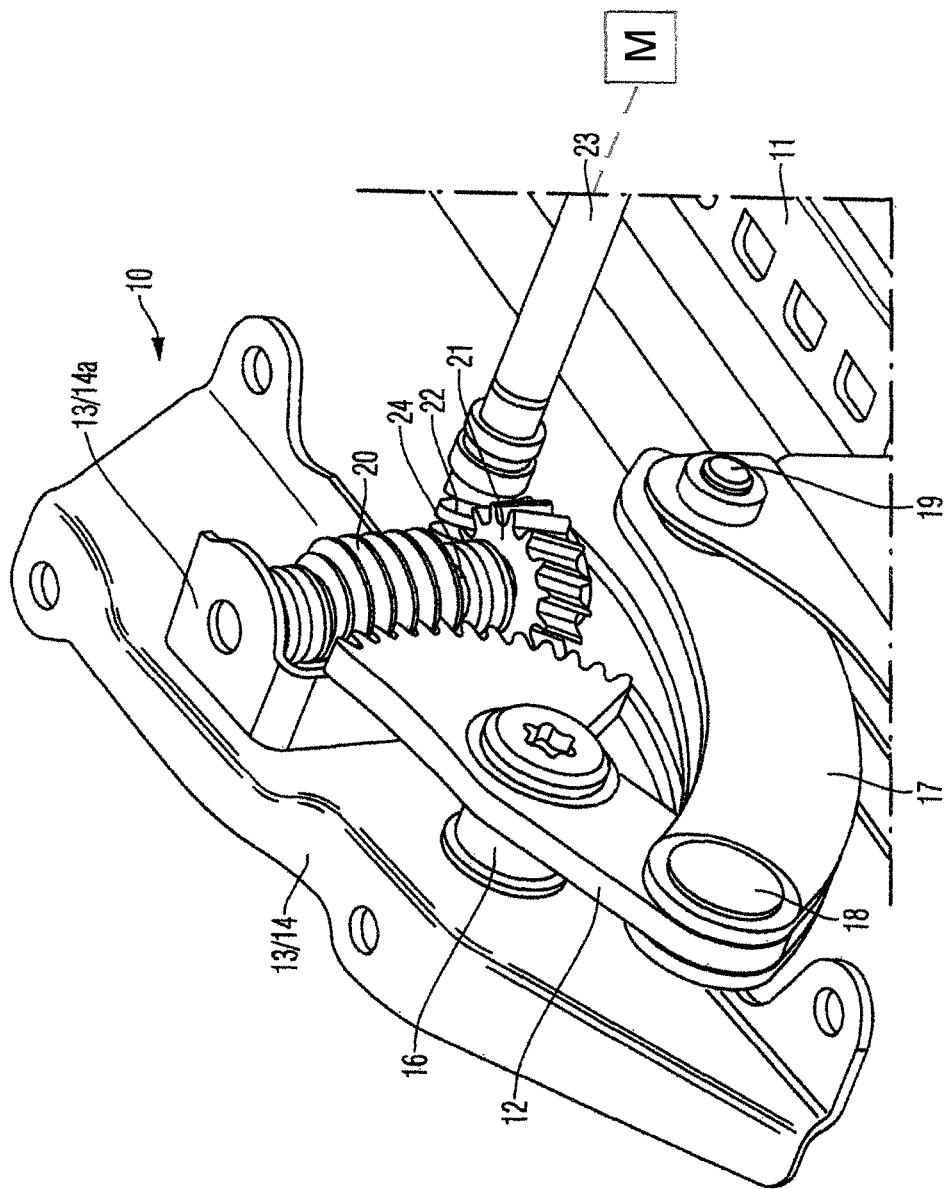
FIG. 2 shows the representation of FIG. 1 with a removed plate-like supporting element of the structural component of the vehicle subassembly to be adjusted.
Figure 3:
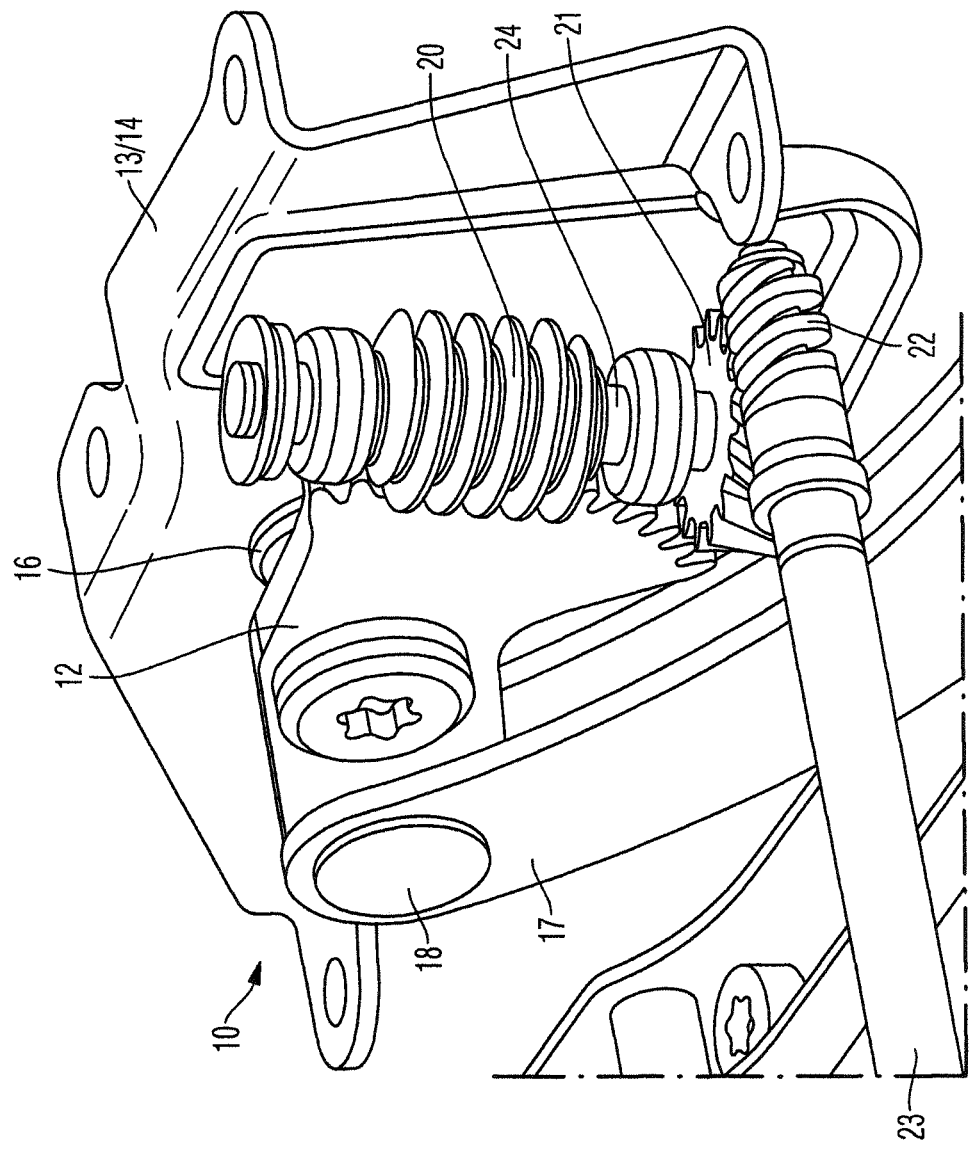
FIG. 3 shows the representation of FIG. 2 in another perspective.
Figure 4:
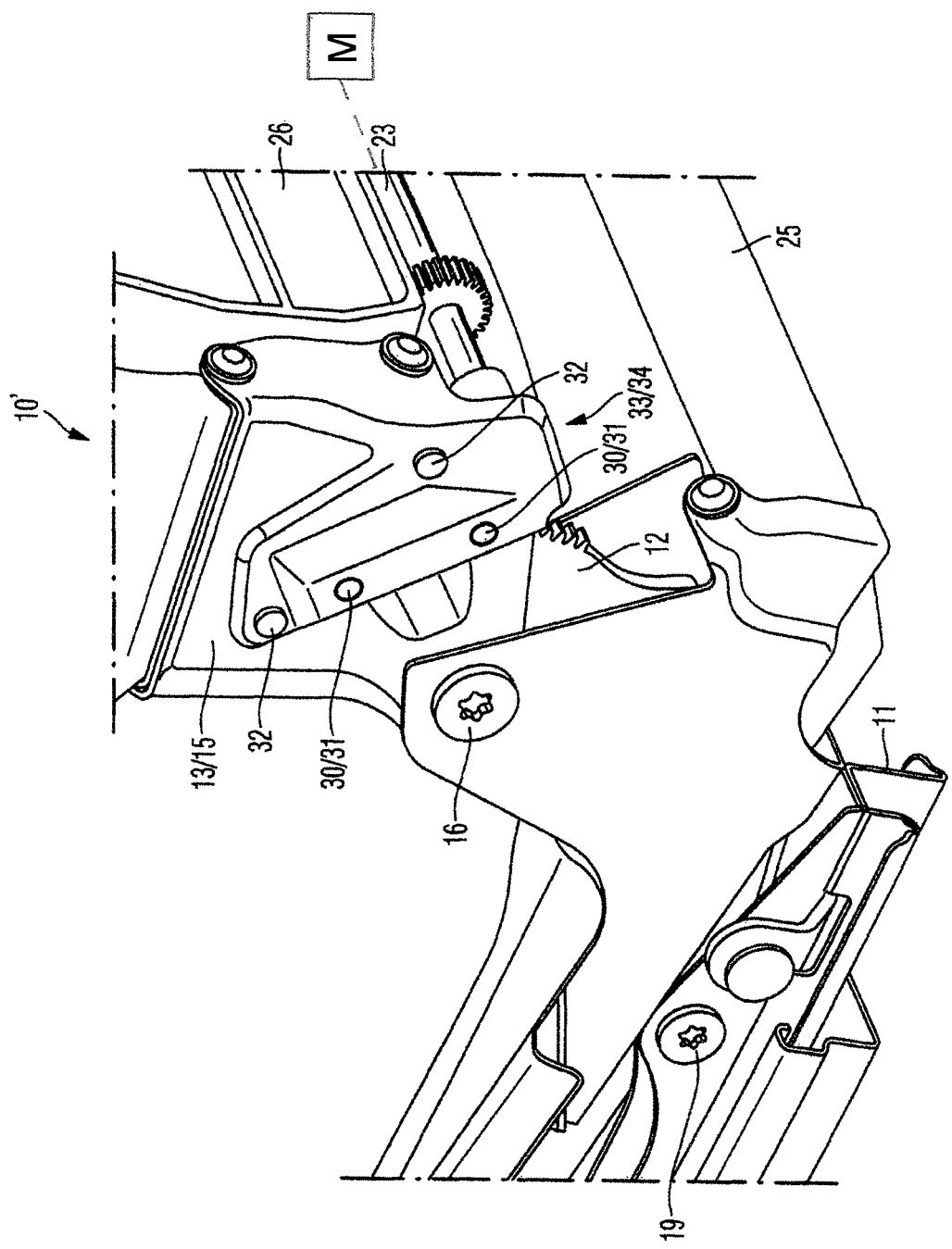
FIG. 4 is a perspective view of a detail of an adjusting device according to a second embodiment of the invention together with a structural component of a vehicle subassembly to be adjusted by the adjusting device.

FIGS. 1 to 3 show different views of a first embodiment of an adjusting device 10 for a vehicle seat. The vehicle seat includes an adjusting rail 11 and a structural component 13.

The adjusting device 10 comprises an adjusting motor M that acts via an adjusting mechanism to drive a toothed rocker 12 of the vehicle subassembly to be adjusted to adjust the vehicle subassembly.

The toothed rocker 12 of FIGS. 1 to 3 is mounted directly on a crash-designed structural component 13 of the vehicle subassembly to be adjusted, which, in the exemplary embodiment of FIGS. 1 to 3, is formed by two substantially parallel plate-like supports 14, 15 and a supporting element 14a. The supporting element 14a is an integral component of the plate-like support 14. The toothed rocker 12 is mounted on a bolt 16 that extends between the two plate-like supports 14 and 15 of the structural component 13 of the vehicle subassembly to be adjusted. Both ends of the bolt 16 are fastened respectively to one of the two plate-like supports 14 and 15 of the structural component 13 of the vehicle subassembly to be displaced.

When the vehicle subassembly to be adjusted is a vehicle seat, the plate-like support 14 of the structural component 13 is fastened directly to a seat frame structure (not shown in FIGS. 1 to 3) and/or a backrest frame structure (not shown) of the vehicle seat.

In the exemplary embodiment of FIGS. 1 to 3, the toothed rocker 12 is attached via a rocker lever 17 to the adjusting rail 11 of the vehicle seat to be adjusted, the rocker lever 17 being provided on both sides with rotary joints, namely a first rotary joint 18 on a first side via which the rocker lever 17 acts on the toothed rocker 12, and a second rotary joint 19 on an opposite second side via which the rocker lever 17 acts on the adjusting rail 11.

As can best be discerned from FIGS. 2 and 3, the adjusting mechanism, via which the adjusting motor of the adjusting device drives the toothed rocker 12, comprises an adjusting worm 20, a gearwheel 21 and a drive worm 22. The drive motor M drives, via a flexible shaft 23, the drive worm 22, which drives the gearwheel 21, which, together with the adjusting worm 20, is fastened on a shaft 24.

By rotating the drive worm 22, the shaft 24 and hence the adjusting worm 20 can be rotated via the gearwheel 21, with the adjusting worm 20 directly driving the toothed rocker 12 in order to adjust the vehicle subassembly to be adjusted, namely the vehicle seat in the exemplary embodiment shown.

In the exemplary embodiment of FIGS. 1 to 3, the adjusting worm 20 which directly drives the toothed rocker 12 is mounted directly on the vehicle subassembly to be adjusted, namely on the structural component 13 of the vehicle subassembly to be adjusted. The crash-designed structural component 13 of the vehicle subassembly to be adjusted, namely the supporting elements 14, 14a and 15 thereof, forms an adjusting mechanism housing which is designed for a crash situation and is an integral part of the structural component 13.

In the exemplary embodiment of FIGS. 1 to 3, not only the adjusting worm 20 is mounted directly on the structural component 13 of the vehicle seat to be adjusted; rather, the adjusting worm 20, together with the shaft 24 and the gearwheel 21, is mounted directly on the structural component 13 of the vehicle seat to be adjusted. Here, as has already been stated, the two plate-like supporting elements 14 and 15 of the crash-designed structural component 13 of the vehicle seat which extend parallel to one another form an adjusting mechanism housing.

Not only the adjusting worm 20, the shaft 24 and the gearwheel 21 are positioned between the two plate-like supporting elements 14 and 15 of the crash-designed structural component 13 of the vehicle subassembly to be adjusted; rather, the drive worm 22 also protrudes at least partially into the housing space defined by the plate-like supporting elements 14 and 15.

Furthermore, the toothed rocker 12 is positioned, by way of a portion which has teeth, between the plate-like supporting elements 14 and 15. Here, the plate-like supporting elements 14 and 15 of the structural component 13 form lateral stops for the toothed rocker 12, the plate-like supporting elements 14 and 15 of the structural component 13 preventing a lateral tilting of the toothed rocker 12.

The adjusting worm 20 is designed as a self-locking locking worm and, in the exemplary embodiment of FIGS. 1 to 3, is mounted directly on the crash-designed supporting structural component 13. The adjusting worm 20, which also serves as a self-locking locking worm, is integrated directly into the structural component 13.

In the exemplary embodiment of FIGS. 1 to 3, the crash-designed structural component 13 of the vehicle seat to be adjusted directly forms the adjusting mechanism housing, which, even in the event of a crash, guarantees a secure locking of the vehicle seat to be adjusted via the adjusting worm 20. Locking of the vehicle seat to be adjusted is effected directly between the adjusting worm 20 and the toothed rocker 12.

A second exemplary embodiment of an adjusting device 10' according to the invention for a vehicle subassembly to be adjusted, in particular for a vehicle seat, is shown in FIGS. 4 to 8. To avoid unnecessary repetition, the same reference numbers as used in conjunction with the exemplary embodiment of FIGS. 1 to 3 will be used in conjunction with the exemplary embodiment of FIGS. 4 to 8 to denote the same subassemblies. The text which follows will focus particularly on those details through which the exemplary embodiments of FIGS. 1 to 3 and FIGS. 4 to 8 differ.

Like the adjusting device 10 of the exemplary embodiment of FIGS. 1 to 3, the adjusting device 10' of the exemplary embodiment of FIGS. 4 to 8 has an adjusting mechanism which comprises an adjusting worm 20 which acts directly on the toothed rocker 12 and directly drives the toothed rocker 12. In addition to the adjusting worm 20, the adjusting mechanism again comprises a gearwheel 21 which, together with the adjusting worm 20, is positioned on a shaft 24, a drive worm 22 driving the gearwheel 21 positioned on the shaft 24 and thus rotating the shaft 24 along with the adjusting worm 20 positioned on the shaft 24. In the exemplary embodiment of FIGS. 4 to 8, too, the adjusting mechanism is mounted directly on the vehicle subassembly to be adjusted, namely on the crash-designed structural component 13 of the vehicle subassembly to be adjusted, which component is formed, also in the exemplary embodiment of FIGS. 4 to 8, again by two plate-like supporting elements 14 and 15 extending substantially parallel to one another.

In FIGS. 4 to 8, this structural component 13 is shown together with a seat frame structure 25 and a backrest frame structure 26 of the vehicle seat. The bolt 16 is seated in the backrest pivot point of the seat.

In the exemplary embodiment of FIGS. 4 to 8, too, as in the exemplary embodiment of FIGS. 1 to 3, the adjusting mechanism structurally reinforces the vehicle subassembly to be adjusted and is an integral part of the crash-designed structural component 13 of the vehicle subassembly to be adjusted.

In the exemplary embodiment of FIGS. 4 to 8, the adjusting worm 20 of the adjusting mechanism of the adjusting device 10' according to the invention is not mounted directly on the structural component 13, but indirectly via a separate adjusting mechanism housing 27.

The separate adjusting mechanism housing 27 of the adjusting device 10' of the exemplary embodiment of FIGS. 4 to 8 is mounted directly on the structural component 13 of the vehicle subassembly to be adjusted; by contrast, the adjusting worm 20 is mounted indirectly on this structural component 13 via the separate adjusting mechanism housing 27.

Figure 5:
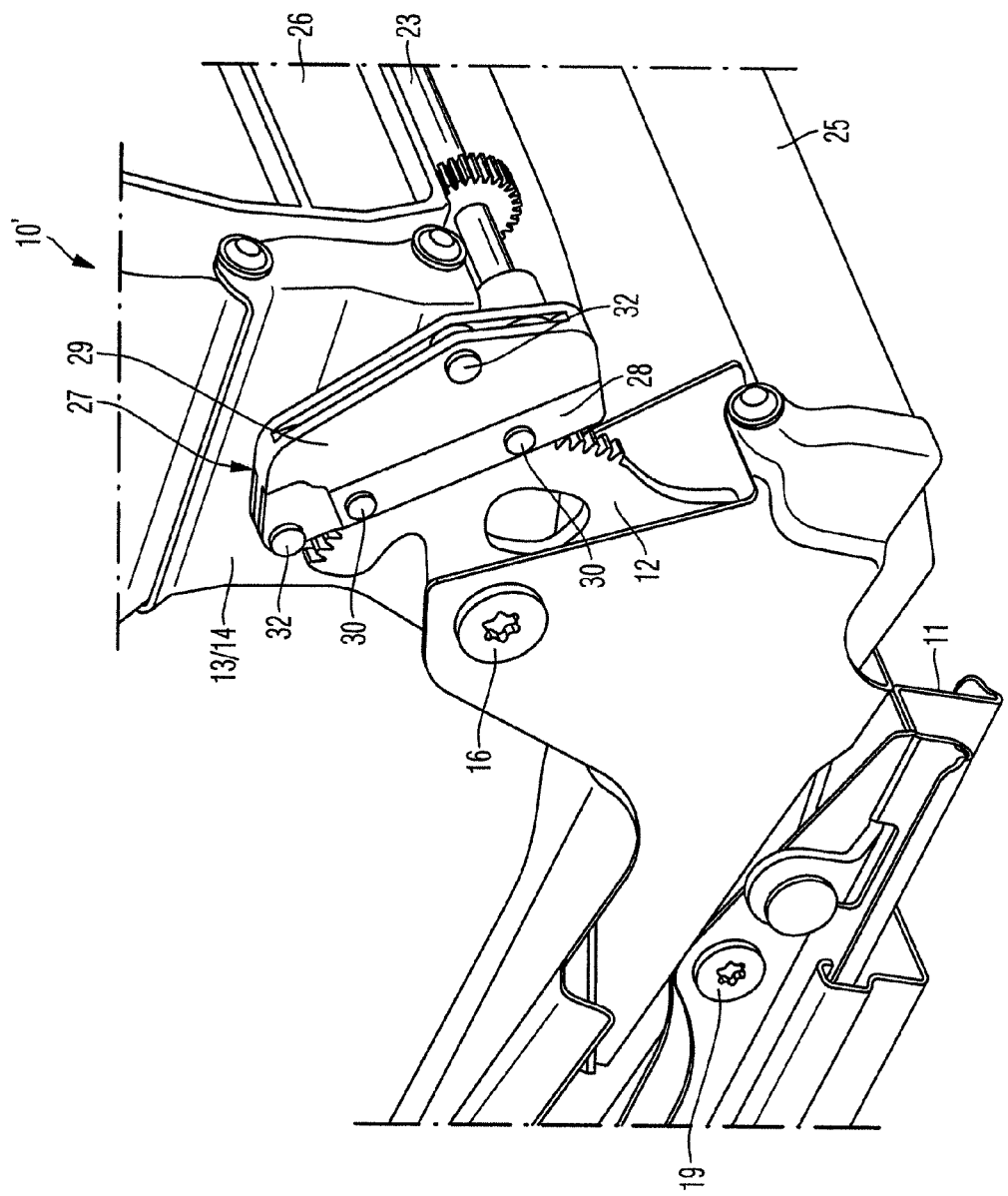
FIG. 5 shows the representation of FIG. 4 with a removed plate-like supporting element of the structural component of the vehicle subassembly to be adjusted.
Figure 6:
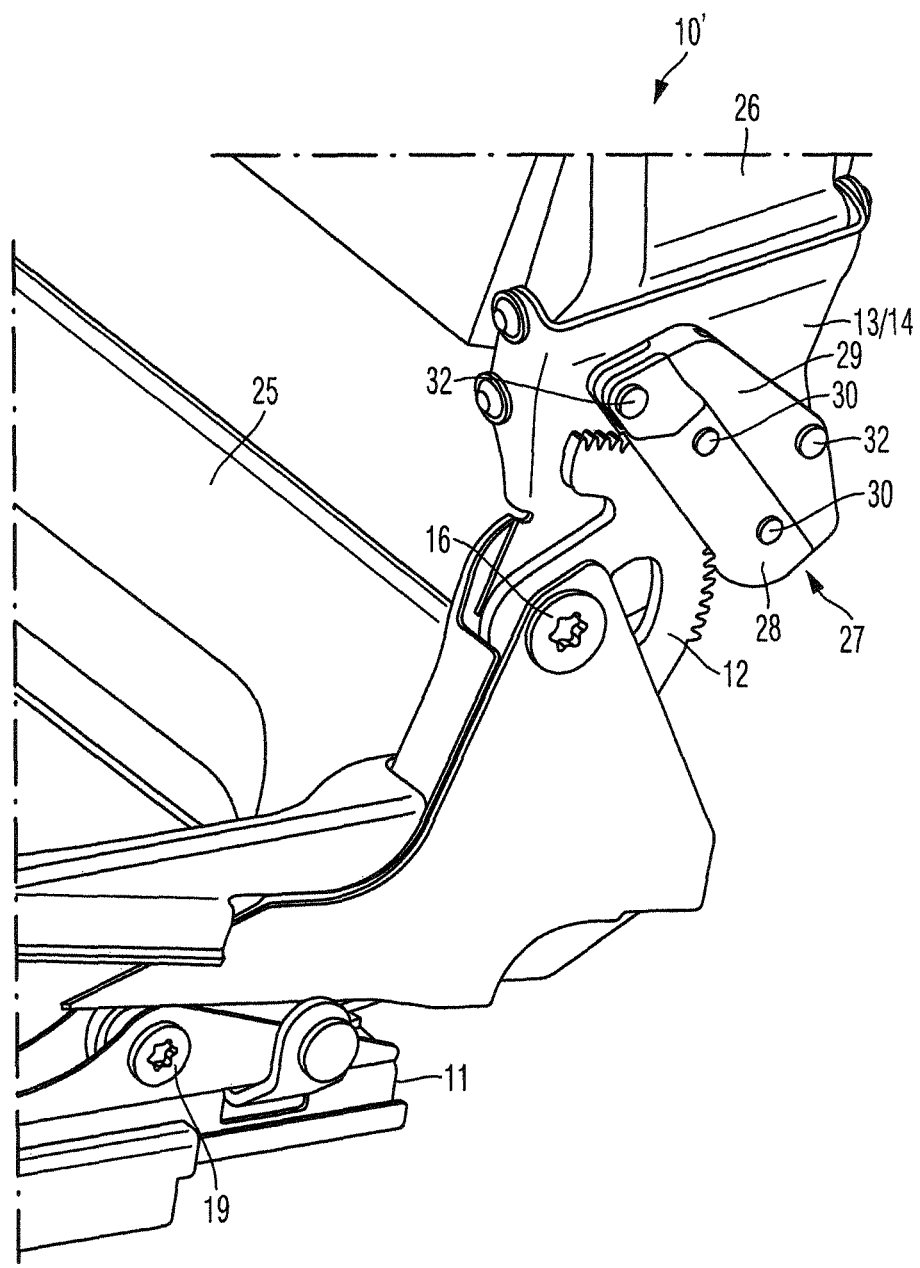
FIG. 6 shows the representation of FIG. 5 in another perspective.
Figure 7:
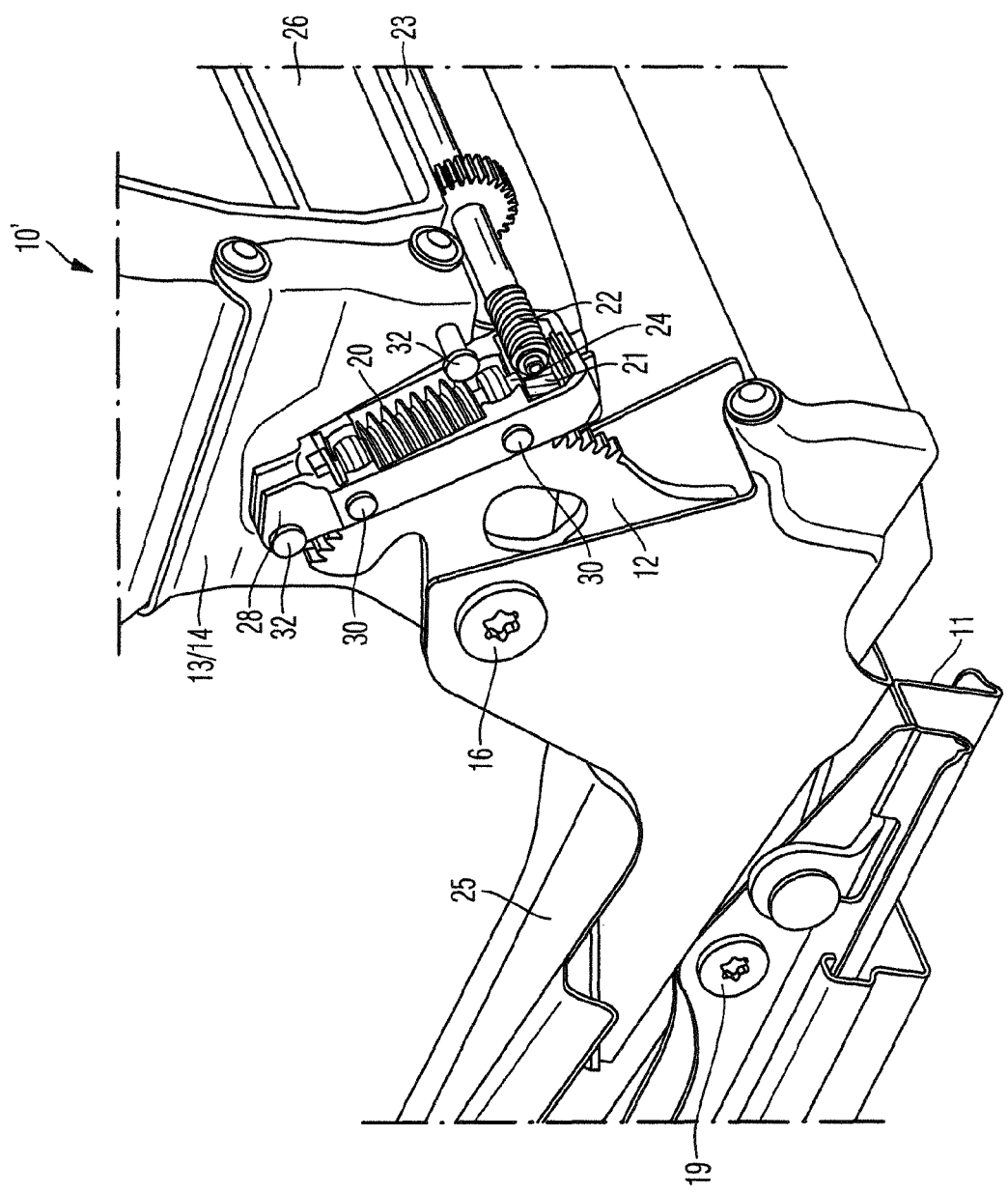
FIG. 7 shows the representation of FIG. 5 with a partially removed adjusting mechanism housing.
Figure 8:
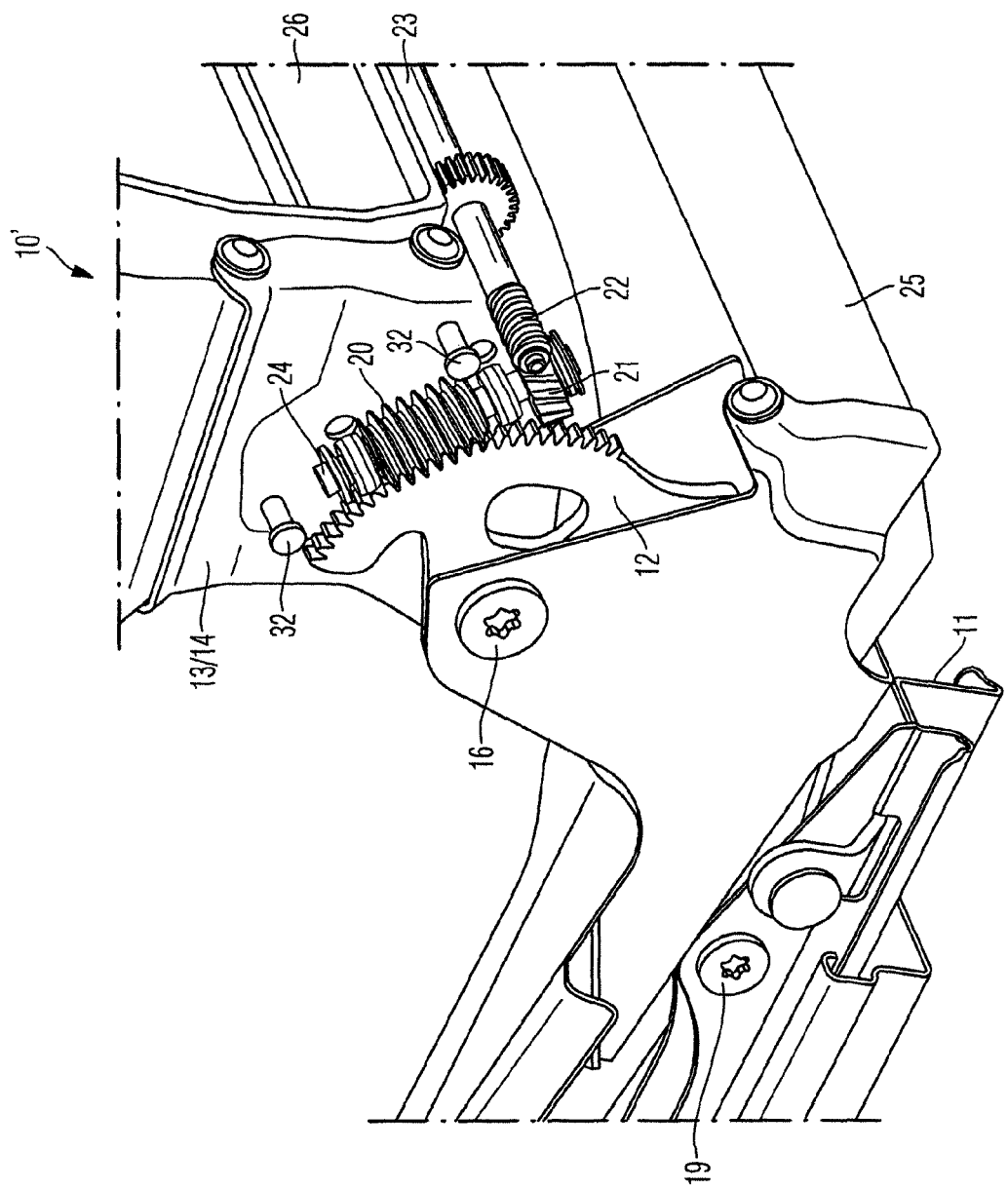
FIG. 8 shows the representation of FIG. 5 with a completely removed adjusting mechanism housing.

In the exemplary embodiment of FIGS. 4 to 8, the separate adjusting mechanism housing 27 is formed in two parts from two housing parts 28 and 29. In FIGS. 5 and 6, both housing parts 28 and 29 of the adjusting mechanism housing 27 are visible, while in FIG. 7 the housing part 29 has been removed in order to allow a view of the adjusting worm 20, the shaft 24, the gearwheel 21 and the drive worm 22.

Accordingly, the shaft 24, together with the gearwheel 21 fastened on the shaft 24 and the adjusting worm 20 fastened on the shaft 24, is accommodated in the separate adjusting mechanism housing 27, with the adjusting mechanism housing 27 being mounted directly on the structural component 13 of the vehicle subassembly to be adjusted, namely in such a way that the adjusting mechanism housing 27 is arranged between the two plate-like supporting elements 14 and 15 of the structural component 13 which extend substantially parallel to one another and is mounted directly on said supporting elements.

It should be noted at this point that, dependent on the design of the adjusting mechanism housing 27, it is possible under certain circumstances to dispense with one of the plate-like supporting elements of the structural component 13, namely the plate-like supporting element 15. Preference is given, however, to the variant shown in FIGS. 4 to 8 in which the structural component 13 comprises both plate-like supporting elements 14 and 15.

The separate adjusting mechanism housing 27, namely the housing part 28 thereof, comprises projections 30 which engage in a form-fitting manner in cutouts 31 of the supporting structure 13. The projections 30 are preferably formed on both sides of the housing part 28, in which case these projections 30 engage in cutouts in both plate-like supporting elements 14 and 15 of the supporting structure 13.

In addition to this form-fitting fixing of the separate adjusting mechanism housing 27 to the supporting structure 13, fastening means 32 are present which likewise serve to mount the separate adjusting mechanism housing 27 on the structural component 13. Thus, these fastening means 32 are designed as rivets which extend in a form-fitting manner, on the one hand, through cutouts of the adjusting mechanism housing 27 and, on the other hand, through cutouts of the plate-like supporting elements 14 and 15. It can thus be gathered, in particular from FIGS. 5 and 6, that a first fastening means 32 serves for the form-fitting fastening of the housing part 28 to the structural component 13, and that a second fastening means 32 serves for the fastening of the housing part 29 to the structural component 13 of the vehicle subassembly to be adjusted. The unit consisting of the plate-like supporting elements 14 and 15 of the structural component 13 and the adjusting mechanism positioned between said supporting elements is held together, transversely with respect to the longitudinal direction of a vehicle in which the vehicle subassembly to be adjusted is installed, via the fastening means 32 which are preferably designed as rivets. Furthermore, the fastening means 32, like the projections 30, serve to absorb forces and moments.

In addition to the plate-like supporting elements 14 and 15, the housing part 28 of the separate adjusting mechanism housing 27 makes available further lateral stops for the toothed rocker 12 in order to prevent lateral tilting thereof and hence a disengagement with the adjusting worm 20.

It can thus be gathered, in particular from FIG. 6, that the toothed rocker 12, in the portion on which teeth thereof are formed, is laterally guided partially on the housing part 28 of the adjusting mechanism housing 27 in order to protect the toothed rocker 12 from lateral tilting.

Consequently, it is ensured that, even under high loading, for example in a crash situation, the position of the toothed rocker 12 relative to the adjusting worm 20, which acts as a locking worm, remains unchanged.

A further particular feature of the exemplary embodiment of FIGS. 4 to 8 is that the plate-like supporting element 15 of the structural component 13 of the vehicle subassembly to be adjusted has, on a portion 33, a bent-off section 34 which partially encloses the separate adjusting mechanism housing 27 at an axial end, namely at the lower end. As a result it is possible, under high loads, in particular in a crash situation, for a movement of the adjusting worm 20, which acts as a locking worm, together with the shaft 24 to be prevented in the axial direction of the shaft 24. Also as a result, the adjusting worm 20 acting as a locking worm is secured in its position in a crash situation.

Accordingly, in the exemplary embodiment of FIGS. 4 to 8, the axial position of the adjusting worm 20, which serves as a locking worm, relative to the toothed rocker 12 is ensured firstly by the projections 30, secondly by the fastening means 32 and thirdly by the bent-off section 34. A means for securing the adjusting worm 20, which acts as a locking worm, against rotating or tilting relative to the toothed rocker 12 is achieved by the form-fitting projections 30 and the likewise form-fitting fastening means 32.

Overall, it is consequently possible for a disengagement of toothed rocker 12 and adjusting worm 20 to be achieved under a high load such that the adjusting device 10' remains locked even in a crash situation.

In the exemplary embodiment of FIGS. 4 to 8, the housing parts 28 and 29 of the separate adjusting mechanism housing 27 are preferably manufactured from castings of a magnesium alloy. The projections 30 are an integral component of the cast housing part 18.

The supporting elements 14 and 15 of the supporting structure 13 are preferably manufactured from aluminum or steel. The seat frame structure 25 and the backrest frame structure 26 are preferably cast from a magnesium alloy.

Accordingly, the present invention proposes an adjusting device 10, 10' for a vehicle subassembly to be adjusted, such as a vehicle seat, in which an adjusting worm 20, which is designed as a self-locking locking worm, of an adjusting mechanism acts directly on the toothed rocker 12, with the adjusting mechanism, which comprises the adjusting worm 20 designed as a self-locking locking worm, being mounted directly on a structural component 13 of the vehicle subassembly to be adjusted and structurally reinforcing the vehicle subassembly to be adjusted.

Accordingly, the adjusting worm 20 of the adjusting mechanism which is designed as a locking worm acts directly on the toothed rocker 12.

The adjusting mechanism is an integral part of a structural component 13 of the vehicle subassembly to be adjusted and accordingly transfers forces and moments even in a crash situation and thus relieves other structural components of the vehicle subassembly to be adjusted.

All further components of the adjusting device which are positioned between the adjusting worm 20 designed as a locking worm and the adjusting motor do not have to be dimensioned for a crash situation, but only for the adjusting function. The adjusting worm 20 designed as a locking worm is attached directly or indirectly to the crash-designed structural component of the vehicle subassembly to be adjusted and accordingly integrated therein.

Since the locking of the adjusting device 10, 10' occurs directly at the toothed rocker 12, accordingly the subassemblies formed between the adjusting worm 20 designed as a locking worm and the drive motor do not have to be designed for a crash situation but only for the adjusting function. As a result, these subassemblies can be dimensioned to be smaller and lighter. Consequently, further weight savings can be achieved.

The adjusting device 10, 10' according to the invention is preferably used on a vehicle seat. A vehicle seat has a plurality of adjusting devices, thus, for example, a first adjusting device designed as a height-setting device, a second adjusting device designed as a seat inclination adjusting means, and a third adjusting device designed as a backrest inclination adjusting means. Preferably, all of these adjusting devices are designed in the manner described above.

What is claimed is:

1. An adjustable vehicle subassembly, comprising an adjusting motor, a drive worm driven by the adjusting motor, an adjusting mechanism that drives a toothed rocker of the vehicle subassembly, the adjusting mechanism structurally reinforcing the vehicle subassembly, and including a shaft, a gearwheel fastened on the shaft and driven by the drive worm to rotate the shaft and an adjusting worm fastened on the shaft and rotating with the shaft for directly driving the toothed rocker.

2. The adjustable vehicle subassembly of claim 1, wherein the adjusting worm of the adjusting mechanism is a self-locking locking worm.

3. The adjustable vehicle subassembly of claim 1, wherein the adjusting mechanism is an integral component of a crash-designed structural component of the vehicle subassembly.

4. The adjustable vehicle subassembly of claim 3, wherein the shaft, together with the gearwheel fastened thereon and the adjusting worm fastened thereon, is mounted on the crash-designed structural component of the vehicle subassembly.

5. The adjustable vehicle subassembly of claim 3, wherein the shaft, together with the gearwheel fastened thereon and the adjusting worm fastened thereon, is positioned between at least two supporting elements of the crash-designed structural component which form an adjusting mechanism housing for the adjusting mechanism, and directly mounted on said supporting elements.

6. The adjustable vehicle subassembly of claim 3, wherein the structural component of the vehicle subassembly on which the adjusting worm of the adjusting mechanism is mounted comprises at least one supporting element.

7. The adjustable vehicle subassembly of claim 6, wherein the toothed rocker is positioned at least partially between and mounted on at least two substantially parallel supporting plates of the structural component, wherein the supporting plates form lateral stops for the toothed rocker and preventing lateral tilting of the toothed rocker.

8. The adjustable vehicle subassembly of claim 3, wherein the adjusting mechanism comprises a separate adjusting mechanism housing in which the shaft, together with the gearwheel fastened thereon and the adjusting worm fastened thereon, is accommodated, the separate adjusting mechanism housing being an integral component of the crash-designed structural component and structurally reinforces the crash-designed structural component in an event of a crash.

9. The adjustable vehicle subassembly of claim 8, wherein the separate adjusting mechanism housing forms lateral stops for the toothed rocker and prevents a lateral tilting of the toothed rocker.

10. The adjustable vehicle subassembly of claim 8, wherein the separate adjusting mechanism housing is mounted directly on and disposed between at least two substantially parallel supporting plates of the crash-designed structural component of the vehicle subassembly.

11. The adjustable vehicle subassembly of claim 10, wherein the separate adjusting mechanism housing has projections that engage in a form-fitting manner in cutouts of the or of each supporting plate.

12. The adjustable vehicle subassembly of claim 10, wherein fasteners engage in a form-fitting manner in cutouts of the separate adjusting mechanism housing and in cutouts of the supporting plates.

13. The adjustable vehicle subassembly of claim 10, wherein at least one of the supporting plates is provided on a portion thereof with a bent-off section that partially encloses the separate adjusting mechanism housing at an axial end.

14. A vehicle seat having a seat cushion, a backrest, a first adjusting device designed as a height-setting device, a second adjusting device designed as a seat inclination adjusting device, and a third adjusting device designed as a backrest inclination adjusting device, at least one of the adjusting devices being the adjustable vehicle subassembly of claim 1.

* * * * *